Patented Mar. 12, 1940

2,193,773

UNITED STATES PATENT OFFICE 2,193,773

ACCELERATOR OF VULCANIZATION

Arthur W. Sloan, Akron, Ohio, assignor to The B. F. Goodrich Company, New York, N. Y., a corporation of New York No Drawing. Application September 15, 1937, Serial No. 163,991

20 Claims. (Cl. 260—793)

This invention relates to the art of rubber manufacture and has as its chief object to provide a new and improved class of accelerators of vulcanization.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was being stored prior to vulcanization, making such accelerators practically useless for compounding in rubber on an industrial scale. This uncontrollability combined with their relative instability resulted in a search for less active, more stable materials.

In the process of this invention, the vulcanization of rubber is accelerated by a substituted ammonium salt of a diaryl dithiocarbamic acid. A wide variety of substituted ammonium compounds may be used including aliphatic, aromatic, and alicyclic hydrocarbon ammonium salts as well as hydrocarbon ammonium salts containing non-acid substituents such as alkoxy, aryloxy, nitro, halogen, mono, di, and tri alkylamino, mono, di, and tri arylamino, alkylarylamino, hydroxy and similar groups on the hydrocarbon groups attached to the ammonium nitrogen. Similar non-acid groups may be substituted on the aryl groups of the dithiocarbamic portion of the molecule.

I have found that quaternary ammonium salts of diaryl dithiocarbamic acids are among the most useful accelerators of this invention. A wide variety of quaternary ammonium salts may be used, including those formed by reacting hexamethylenetetramine, hexaethylidenetetramine, triethanol amine, trimethyl amine, phenyldimethylamine, tris(beta-hydroxyethyl) amine, morpholines, quinolines, pyridines, acridines, etc. with alkyl (including aralkyl) halides such as methyl iodide, methoxymethyl iodide, or benzyl chloride, dialkyl sulfates such as dimethyl sulfate or diethyl sulfate, halogenated ketones such as 1 chlor 2 butanone, halogenated esters such as ethyl chloracetate and halogenated thiazoles such as 2 chlorbenzothiazole and 6 nitro, 2 chlorbenzothiazole. By reacting the quaternary ammonium salts thus formed with an alkali metal salt of diphenyl dithiocarbamic acid or the similar ditolyl (ortho, meta, para or mixed), dinaphthyl (alpha, beta or mixed), dixenyl, phenyl-naphthyl, phenyl-xenyl, phenyl-cumyl, phenyl-p-isopropenylphenyl, p-allylphenyl-beta-naphthyl, phenyl-p-isopropoxyphenyl, phenyl-p-phenyloxyphenyl, phenyl-p-hydroxyphenyl, di-o-anisyl, phenyl-p-chlorphenyl, phenyl-m-bromphenyl, phenyl-p-dimethylaminophenyl, phenyl-p-methylaminophenyl, phenyl-p-anilinophenyl, phenyl-p-nitrophenyl, or other like diaryl dithiocarbamic acids, compounds which are excellent accelerators may be produced. The term aryl is to be understood as designating both unsubstituted and substituted monovalent radicals containing an aromatic carbocyclic ring with the free valence on a nuclear carbon atom unless it is specifically limited to hydrocarbon groups. The term alkyl designates both unsubstituted and substituted groups unless otherwise limited and aralkyl groups such as benzyl are considered to be substituted alkyl groups since such groups exhibit typical aliphatic properties. The diarylarylene bis dithiocarbamic acids such as diphenylphenylene bis dithiocarbamic acid are also included in the generic term diaryl dithiocarbamic acid.

Typical quaternary ammonium salts which have been tested and found to have excellent properties include methyl hexamethylenetetrammonium diphenyl dithiocarbamate, benzyl hexamethylenetetrammonium diphenyl dithiocarbamate, allyl hexamethylenetetrammonium phenyl-beta-naphthyl dithiocarbamate, 2-benzothiazyl hexamethylenetetrammonium diphenyl dithiocarbamate, 2(6-nitrobenzothiazyl) hexamethylenetetrammonium diphenyl dithiocarbamate, N methyl pyridinium diphenyl dithiocarbamate, N, N methyl phenyl morpholinium diphenyl dithiocarbamate, N methyl acridinium phenyl-beta-naphthyl dithiocarbamate, N benzyl quinolinium diphenyl dithiocarbamate, tetramethylammonium diphenyl dithiocarbamate, benzyltrimethylammonium diphenyl dithiocarbamate, benzyl tri(beta-hydroxyethyl) ammonium diphenyl dithiocarbamate, trimethylphenylammonium diphenyl dithiocarbamate and tetramethylammonium phenyl-beta-naphthyl dithiocarbamate.

Ammonium salts of diaryl dithiocarbamic acids in which one, two, or three hydrogens are attached to the ammonium nitrogen are also within the scope of this invention. Typical examples include methyl, ethyl, cyclohexyl, phenyl, benzyl, isopropyl, isopropenyl, N-cyclopentamethylene, methoxymethyl, chlormethyl, methylaminomethyl, anilinomethyl, dimethyl, methyl-allyl, methylphenyl, di(beta-hydroxyphenyl), trimethyl, dimethyl-phenyl, dimethyl-benzyl, and similar hydrocarbon and substituted hydrocarbon ammonium diaryl dithiocarbamates.

Any of the accelerators of this invention can be easily prepared by those skilled in the art. The usual method consists in reacting an ammonium salt with the sodium salt of the desired diaryl dithiocarbamic acid.

As a specific example of one embodiment of the method of this invention, I reacted benzyl hexamethylenetetrammonium chloride with sodium diphenyl dithiocarbamate to make benzyl hexamethylenetetrammonium diphenyl dithiocarbamate which melts at 157–159° C. A rubber composition was prepared by mixing rubber 100 parts by weight, zinc oxide 5 parts, stearic acid 1 part, sulfur 3.5 parts, and benzyl hexamethylenetetrammonium diphenyl dithiocarbamate 0.5 part. When this composition was cured in a mold for 30 minutes at 240° F. there was formed a well-vulcanized product with a tensile strength of 4600 lbs. per sq. in. Furthermore, the tensile strength remains unchanged after a 120 minute cure at the same temperature. This remarkably long curing range makes it possible to vulcanize completely very thick sections of rubber without the danger of over-curing the surface.

When the above composition containing as the accelerator methyl hexamethylenetetrammonium diphenyl dithiocarbamate 0.5 part was cured for 15 minutes at 240° F., it attained a tensile strength of 400 lbs. per sq. in., and a cure for 30 minutes at the same temperature produced a tensile strength of 4700 lbs. per sq. in.

A variety of other substituted ammonium salts were prepared, and 0.5 part of each were substituted in the above recipe as the accelerator. When the compositions were cured for 60 minutes at 240° F. the following results were obtained:

| Accelerator | Tensile strength pounds per square inch | Percent elongation |
| --- | --- | --- |
| Methylammonium phenyl-beta-naphthyl dithiocarbamate | 4795 | 725 |
| Ethylammonium phenyl-beta-naphthyl dithiocarbamate | 4660 | 745 |
| Dimethylammonium diphenyl dithiocarbamate | 4220 | 700 |
| Diethylammonium diphenyl dithiocarbamate | 4725 | 685 |
| Dimethylammonium phenyl-beta-naphthyl dithiocarbamate | 4820 | 730 |
| N-cyclopentamethyleneammonium diphenyl dithiocarbamate | 4270 | 740 |
| Trimethylammonium phenyl-beta-naphthyl dithiocarbamate | 4750 | 790 |
| Benzyl-tri (beta-hydroxyethyl) ammonium phenyl-beta-naphthyl dithiocarbamate | 3845 | 855 |
| Trimethyl-phenylammonium phenyl-beta naphthyl dithiocarbamate | 3730 | 850 |
| Dimethyl-ethyl-phenylammonium phenyl-beta-naphthyl dithiocarbamate | 4885 | 735 |
| Tetramethylammonium phenyl-beta-naphthyl dithiocarbamate | 4065 | 660 |

Similar excellent results may be obtained with other accelerators of this invention.

Not only are the compounds of this invention good accelerators, but they are very stable compounds which can be kept for a long time without deterioration. Samples of ethyl, diethyl, and triethylammonium phenyl-beta-naphthyl dithiocarbamates were prepared and kept in stoppered bottles at room temperature for four and a half years. At the end of this time they had not altered in appearance, and tests showed that they had lost none of their accelerating activity. This great stability of the diaryl compounds contrasts strikingly with the instability of the corresponding dialkyl dithiocarbamates which visibly decompose within a short time at room temperatures and which lose accelerating activity in a few weeks when kept at room temperature. The compounds of my invention are therefore much more suitable for commercial processes since it is often desirable to store accelerators or master batches containing them for a year or more before being used.

It is to be understood that the specific examples given above are merely illustrative of one manner of use of the accelerators of this invention; that other accelerators within the scope of the class herein defined may be substituted for the specific compounds used in the examples; that the accelerators of this invention may be used to vulcanize rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply dissolving or suspending therein; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of a substituted ammonium salt of a diaryl dithiocarbamic acid, the salt being free from acidic substituents.

2. The process which comprises vulcanizing rubber in the presence of a quaternary ammonium salt of a diaryl dithiocarbamic acid.

3. The process which comprises vulcanizing rubber in the presence of a quaternary ammonium salt of a di(hydrocarbonaryl) dithiocarbamic acid.

4. The process which comprises vulcanizing rubber in the presence of a hexamethylenetetrammonium diaryl dithiocarbamate.

5. The process which comprises vulcanizing rubber in the presence of an alkyl hexamethylenetetrammonium diaryl dithiocarbamate.

6. The process which comprises vulcanizing rubber in the presence of a hydrocarbon-alkyl hexamethylenetetrammonium diaryl dithiocarbamate.

7. The process which comprises vulcanizing rubber in the presence of a methyl hexamethylenetetrammonium diaryl dithiocarbamate.

8. The process which comprises vulcanizing rubber in the presence of methyl hexamethylenetetrammonium diphenyl dithiocarbamate.

9. The process which comprises vulcanizing rubber in the presence of a hydrocarbon-substituted ammonium di(hydrocarbon-aryl) dithiocarbamate.

10. The process which comprises vulcanizing rubber in the presence of a hydrocarbon-substituted ammonium diaryl dithiocarbamate containing at least two hydrocarbon-alkyl groups on the ammonium nitrogen.

11. The process which comprises vulcanizing rubber in the presence of a dialkylammonium diaryl dithiocarbamate.

12. The process which comprises vulcanizing rubber in the presence of diethylammonium diphenyl dithiocarbamate.

13. The process which comprises vulcanizing rubber in the presence of a hydrocarbon-substituted ammonium diaryl dithiocarbamate containing at least one hydrocarbon-aryl group on the ammonium nitrogen.

14. The process which comprises vulcanizing rubber in the presence of dimethyl-ethyl-phenyl-ammonium phenyl-beta-naphthyl dithiocarbamate.

15. An unvulcanized rubber composition containing rubber, a vulcanizing agent, and a substituted ammonium salt of a diaryl dithiocarbamic acid, the salt being free from acidic constituents.

16. An unvulcanized rubber composition containing rubber, a vulcanizing agent, and a hydrocarbon-alkyl hexamethylenetetrammonium di(hydrocarbonaryl) dithiocarbamate.

17. An unvulcanized rubber composition containing rubber, a vulcanizing agent, and a hydrocarbon-substituted ammonium di(hydrocarbonaryl) dithiocarbamate.

18. An unvulcanized rubber composition containing rubber, a vulcanizing agent, and methyl hexamethylenetetrammonium diphenyl dithiocarbamate.

19. An unvulcanized rubber composition containing rubber, a vulcanizing agent, and diethylammonium diphenyl dithiocarbamate.

20. An unvulcanized rubber composition containing rubber, a vulcanizing agent, and dimethyl-ethyl-phenylammonium phenyl-beta-naphthyl dithiocarbamate.

ARTHUR W. SLOAN.